United States Patent
Anoop et al.

(10) Patent No.: US 9,513,855 B2
(45) Date of Patent: Dec. 6, 2016

(54) PRINT DRIVER INSTALLATION

(71) Applicant: Hewlett-Packard Development Company, L.P., Houston, TX (US)

(72) Inventors: A R Anoop, Boise, ID (US); Senthil Kumar Ramakrishnan, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 13/854,050

(22) Filed: Mar. 30, 2013

(65) Prior Publication Data

US 2014/0293323 A1    Oct. 2, 2014

(51) Int. Cl.
G06F 15/00    (2006.01)
G06F 3/12     (2006.01)
G06F 9/44     (2006.01)

(52) U.S. Cl.
CPC ............. *G06F 3/123* (2013.01); *G06F 3/1203* (2013.01); *G06F 3/1225* (2013.01); *G06F 3/1285* (2013.01); *G06F 9/4411* (2013.01)

(58) Field of Classification Search
CPC ..... G06F 3/1224; G06F 3/1225; G06F 3/1227
USPC ....................................................... 358/1.15
See application file for complete search history.

(56) References Cited

U.S. PATENT DOCUMENTS

| | | |
|---|---|---|
| 6,542,892 B1 | 4/2003 | Cantwell |
| 6,989,910 B2 | 1/2006 | Lomas et al. |
| 2005/0128519 A1* | 6/2005 | Yamauchi ................... 358/1.15 |
| 2010/0328707 A1 | 12/2010 | Miyake |
| 2012/0084365 A1 | 4/2012 | McCann |
| 2013/0268926 A1* | 10/2013 | Colelli .................. G06F 9/445 717/174 |

OTHER PUBLICATIONS

Cburnside, Add Email Printing Capability to Your Current Home Printer with Printeronadd Email Printing Capability to Your Current Home Printer with Printeron, (Research Paper), Jul. 29, 2011.

* cited by examiner

*Primary Examiner* — Mark Milia
(74) *Attorney, Agent, or Firm* — HP Inc. Patent Department

(57) ABSTRACT

In one example of the disclosure, a document is received at a recipient computing device. The document is a document generated at a network-connected printer responsive to an interaction with a user interface included within or attached to the printer. The document includes installation data for the printer. The installation data is utilized to select, configure, or install at the recipient device a print driver for the printer.

14 Claims, 9 Drawing Sheets

PRINT DRIVER INSTALLATION

BACKGROUND

Certain printers are capable of receiving communications and printable content via a network without a direct connection to a desktop computer, notebook computer, or other host computing device. An advantage of such a printer is that print jobs can be received for printing from other computing devices located anywhere around the globe.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

DETAILED DESCRIPTION OF EXAMPLES

Figure 1:
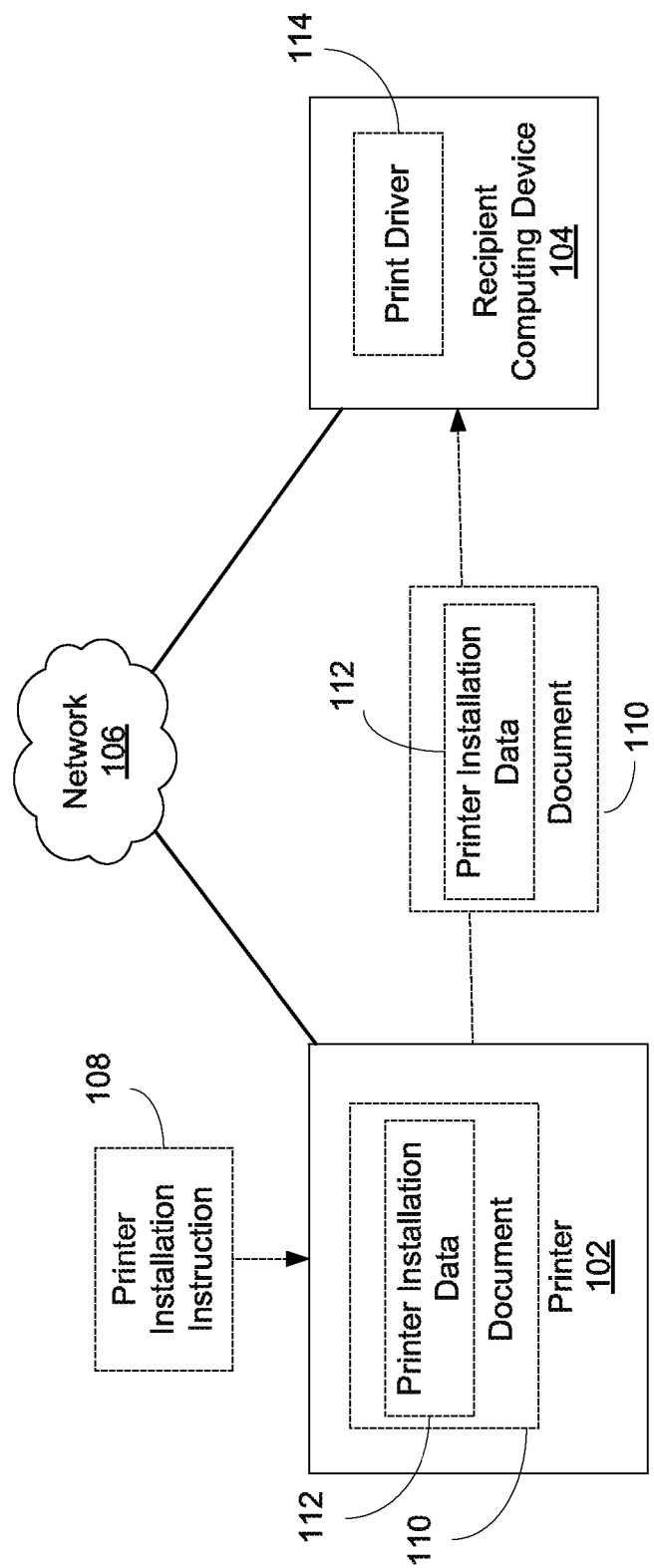
FIG. 1 is a block diagram illustrating a print driver installation system, according to various examples.

In examples, it may be necessary to install a print driver at a computing device in order that the computing device be able to send print jobs to, and otherwise communicate with an internet-connected printer. Typically, a user may install at the computing device a print driver, the driver having been provided by the manufacturer on a CD or other media. Also, it is typical that that the installing user will be instructed to establish a temporary connection cable or other electronic connection between the printer and the computing device during the installation process, such that the printer and the computing device have a direct connection and can exchange installation data as needed. For example, a driver installation CD may include drivers for several related printer models, and the software executing at the computing device may require that the printer provide configuration or other installation data in order for the computing device to choose the correct driver.

This installation process can have drawbacks in certain situations, however. First, if the user seeking to install the print driver loses or misplaces the driver installation CD, or the CD is damaged, the user may need to navigate one or more web sites to find the appropriate driver for the printer. Further, even if the user finds a correct driver version for the printer model, the installation process may require certain configuration or other installation data from the printer to set up options within the driver or otherwise configure the driver. In situations where a temporary cable connection between the internet-connected printer and the computing device is not feasible, e.g., because of the lack of a cable or the distance between the printer and the computing device, for some users it may take some effort and knowledge regarding the printer to provide required installation information to the computing device. Such users could become dissatisfied with the printing device involved or with internet-enabled printers generally.

To address these issues, examples described herein were developed and may provide a print driver installation service. In an example, a user of an internet-connected printer desires to install a print driver at a recipient computing device that is not already electronically connected to the printer. In this example, the user may provide as input to the printer, e.g., via a user interface included within or attached to the printer, a printer installation instruction. In examples, the user may provide the printer installation instruction by choosing as a menu item provided at a printer's touch screen user interface, "Install a Print driver at a Computing Device Not Having a Direct Connection" or "Add a Printer."

Continuing with this example of the disclosure, responsive to the receipt of the user's printer installation instruction, the printer may create a document that includes installation data for the printer. In examples, the installation data for the printer may include, but is not limited to, the printer's IP address, printer model, printer name, or a printer capability. In other examples, the installation data may include a hyperlink, or other link or address, to be utilized by the computing device to retrieve an appropriate print driver. In an example, the printer may run a diagnostics routine, access an internal directory or lookup table, or otherwise poll printer hardware, firmware, or software components to access or create the installation data. In an example, the document that includes the installation data may be any computer data file or other collection of computer data. In another example, the document may be a text computer file. In an example, the document may be any collection of data assembled in a recognized non-proprietary electronic format (e.g. a .txt format). In other examples, the document may be a computer data file in a proprietary format, such a Microsoft® Word document, or a Microsoft Excel® spreadsheet. In other examples, the document may be any electronic recordation of data.

In an example, the printer additionally receives an email address via input at a user interface included within or attached to the printer. In this example, the printer generates or causes the sending of an email that includes the document. The document may be included within the email as an attachment, or may be included in the body of the email. The printer sends the email that includes the document to an email-hosting computing device. The computing device in turn retrieves or otherwise obtains the email that includes the document from the email-hosting computing device. After receipt of the email that includes the document, the computing device utilizes the installation data contained within the document to install a driver for the printer at the computing device.

In another example, a user inserts a portable memory device into a USB interface or other interface at the printer to establish an electronic connection between the portable memory device and the printer. The printer sends the document to the portable memory device. In this example, the user in turn inserts the portable memory device into a USB interlace or other interface at the computing device or otherwise brings the portable memory device into an electronic connection with the computing device. After the electronic connection is established, the computing device obtains the document with the installation data, and utilizes the installation data to install a driver for the printer.

In another example, a user brings smartphone or other mobile computing device into a wireless connection with the printer. In an example, the wireless is via a near field communication ("NFC"), Bluetooth®, other wireless communication connection. In this example, a user in turn brings the mobile computing device into a NFC, Bluetooth®, or other wireless communication connection with the computing device. After the wireless connection is established, the computing device obtains the document with the installation data, and utilizes the installation data to install a driver for the printer.

In an example, the computing device selects or configures the print driver at the computing device responsive to a user interaction with the document. In an example, the user interaction is a user giving the computing device instructions to print the document (e.g. interacting with a "print document" icon or menu sequence), or otherwise attempting to print the document. In another example, the computing device selects or configures the print driver at the computing device responsive to a user interaction with the installation data. In an example, the user interaction is a user mousing over, clicking on, or otherwise interacting with installation data within the document that identifies an IP address, printer model, printer capability, or other element within the document that constitutes installation data.

Advantages of the disclosure are numerous. First, users will appreciate that a print driver installation service provides the ability to forward or broadcast particular printer configuration information or other installation information regarding a network-connected printer to a recipient computing device that needs a driver to communicate with the printer. Users in many situations will appreciate a low number of user steps compared to what may be required if a user were to research and secure a driver for the printer based on the user's limited knowledge of the printer and available drivers. Another advantage of the print driver installation service disclosed herein is that users with a need to install drivers for printers of disparate models and configurations can do so in an attractive and efficient manner that does not require the users to learn a unique installation processes for each printer/computing device combination. These and other advantages of the disclosure will cause users to be more likely to install and utilize internet-connected printers, and user satisfaction with network-connected printers will increase.

It should be noted that while the disclosure is discussed frequently with reference to internet-connected printers, the teachings of the present disclosure are not so limited and can be applied to any network-connected printer. As used herein, a "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing.

As used herein, a "print driver" refers to software or programming that when executed at a job-sending computing device enables communication between a printer and the device, and/or converts a print job or other data to be printed to a format understandable to the printer. A "document" refers to an electronic collection of data that provides information or evidence, or that serves as an electronic record. "Installation data" refers to any printer configuration data or other data regarding a printer that another computing device can use to install, set up, or configure a driver for the printer.

To say that a printer and another computing device are not "directly connected" refers to a condition wherein the devices are not then connected via a cable or other physical apparatus that accomplishes a direct electronic connection, are not then configured to transmit data to each other directly via a wireless connection, and are not then configured to otherwise communicate on a peer to peer basis. An "electronic connection" refers to a transfer of data between two devices, e.g., between two computing devices, that are connected by an electrical conductor. A "wireless connection" refers to a transfer of data between two devices, e.g., between two computing devices, that are not connected by an electrical conductor. A wireless connection may be via a wireless communication protocol or wireless standard for exchanging data.

An "email" refers to a message sent electronically from one email address to another email address. An "email address" refers to a character string, text, image, graphic, or other element that identifies an address from which electronic messages may be sent, or to which electronic messages may be delivered. An "email-hosting computing device" refers to a computing device or computer system that accepts, stores, and delivers email messages. In some examples of email systems, neither the sending and receiving users' computers are required to be online simultaneously.

A "portable memory device" refers to any memory device, including but not limited to a USB flash drive, that can be connected to a computing device for storage, back-up and transfer of computer files or other electronic data, and that is easily transportable by a human. IAs used herein, a "computing device" may be a server, computer networking device, chip set, desktop computer, notebook computer, workstation, mobile computing device, tablet computer, smartphone or any other processing device or equipment. The terms "mobile computing device" and "mobile device" are used synonymously, and refer to any portable computing device. "Print job" or "job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data.

As used herein, a "processing resource" and a "processor" are used synonymously and refer generally any instruction execution system, such as a computer/processor based system or an ASIC (Application Specific Integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Referring now to the drawings, FIG. 1 shows a network-connected printer 102 and a recipient computing device 104, with the printer 102 and the recipient device 104 each connected to a network 106. While the printer 102 and the recipient device 104 are each connected to network 106, printer 102 and recipient device 104 are not directly connected to one another. Network-connected printer 102 represents generally any computing device or group of computing devices operable to produce a printed print job or printed content, and additionally operable to send and receive internet requests, receive printable content and print jobs, and otherwise communicate other computing devices via the network 106. Recipient computing device 104 represents generally any computing device or group of computing devices configured to send and receive network requests, send and receive data, and/or otherwise communicate with other computing devices via network 106. Network 106 represents generally hardware components and computers interconnected by communications channels that allow sharing of resources and information. Network 106 may include a cable, wireless, fiber optic, or remote connection via a telecommunication link, an infrared link, a radio frequency link, or some combination of these, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between the printer 102 and the recipient device 104 as depicted in FIG. 1 represent the logical communication paths between these devices, not necessarily the physical paths between the devices.

In the example of FIG. 1, the network-connected printer 102 receives, via user input at a user interface included within or attached to the printer 102, a printer installation instruction 108. For example, the printer installation instruction 108 may be an instruction made by the user to the printer 102 by the user interacting with an icon or menu item provided at touch screen user interface or other user interface at the printer 102. In example, the icon or menu item may be labeled with text to the effect of "Add a Printer". Responsive to receipt of the printer installation instruction 108, the printer 102 generates a document 110 that includes installation data 112 for the printer 102.

Following the generation of a document 110 that holds the installation data 112, the document 110 is provided to the recipient computing device 104, and the recipient device 104 receives the document 110. In an example, providing the document 110 to the recipient device 104, and the recipient device 104 the document 110, may include the printer 102 receiving an email address via input at a user interface included within or attached to the printer 102. In this example, the printer 102 in turn generates an email that includes the document 110, e.g. in the body or as an attachment to the email, and sends the email, via the network 106, to an email-hosting computing device.

In another example, providing the document 110 to the recipient device 104, and the recipient device 104 the document 110, may include the printer 102 sending the document 110 to a portable memory device that a user brings in to electronic connection with the printer 102. In another example, providing the document 110 to the recipient device 104, and the recipient device 104 receives the document 110, may include the printer 102 sending the document 110 to a smart phone or other mobile computing device that a user brings into a near field communication, Bluetooth®, other short-range wireless communication with the printer 102.

After the printer 102 provides the document 110 to the recipient device 104, and the recipient device 104 receives the document 110, the recipient device 104 installs a print driver 114 for the printer 102, utilizing the installation data 112 to select or configure the driver.

Figure 2:
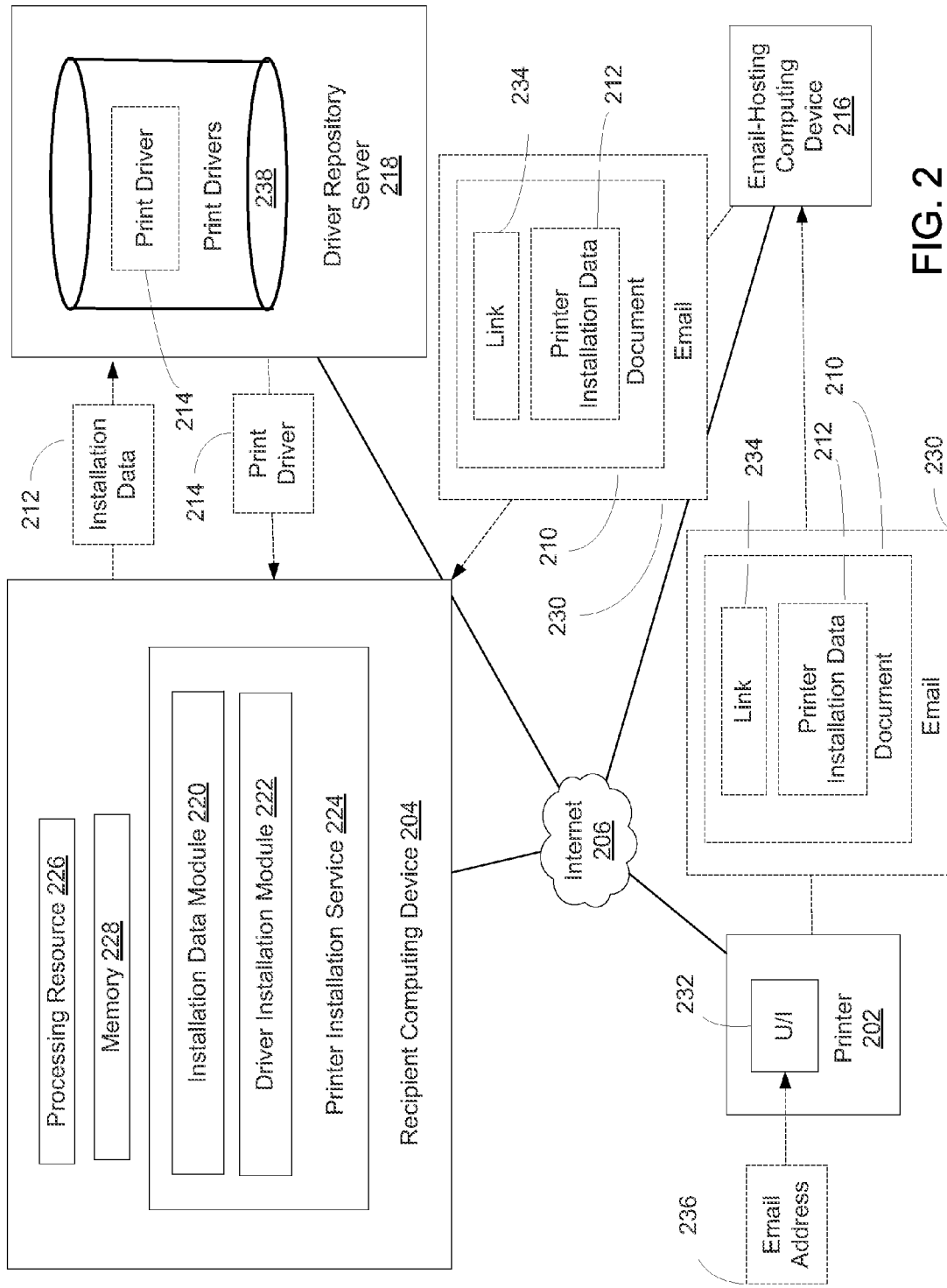
FIG. 2 is a block diagram illustrating a print driver installation system, according to various examples.

FIG. 2 is a block diagram illustrating a system according to various examples. FIG. 2 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows an internet-connected printer 202, a recipient computing device 204, an email-hosting device 216, and a driver repository server 218, each connected to an internet 206. However, the printer 202 and the recipient device 204 are not directly connected to each other, e.g. via a LAN or any physical means such as a printer cable. Printer 202 represents generally any computing device or group of computing devices operable to produce a printed print job or printed content, and additionally operable to send and receive internet requests, receive printable content and print jobs, and otherwise communicate other computing devices, including driver repository 218, via the internet 206. Recipient computing device 204 represents generally any computing device or group of computing devices configured to send and receive network requests, send and receive data, and/or otherwise communicate with other computing devices via internet 206. Email-hosting device 216 represents generally any computing device or group of computing devices operable to accept email messages via the internet 206, store the messages, and deliver the messages via the internet 206. Driver repository server 218 represents generally any computing device or group of computing devices operable to cause the storage of a set of print drivers in memory in association with printer installation data such as printer models, and printer capabilities.

Internet 206 represents generally hardware components and computers interconnected by communications channels that allow sharing of resources and information. Internet 206 may include, at least in part, an intranet, the internet, or a combination of both. The paths followed by internet 206 between the printer 202, recipient device 204, the email-hosting computing device 216, and the driver repository server 218 as depicted in FIG. 2 represent the logical communication paths between these devices, not necessarily the physical paths between the devices.

Recipient computing device 204 is shown to include an installation data module 220, a driver installation module 222, a printer installation service 224, a processing resource 226, and a memory 228. Memory 228 represents generally any memory configured to store program instructions and other data.

In an example, the installation data module 220 executing at recipient computing device 204 causes the recipient device 204 to receive an email 230 from the email-hosting computing device 216. A document 210 included within the email 230 holds installation data 212 applicable or pertinent to the internet-connected printer 202 that is not directly connected to the recipient device 204. The document 210 is a document generated at the printer 202 responsive to a user's interaction with a user interface 232 included within or attached to the printer 202. In this example, the email 230 is an email sent to the email-hosting device 216 by the printer 202, with the sending of the email 230 also being initiated by the user's interaction with the user interface 232. In an example, the user interaction at the user interface 232 to send the email 230 includes the user providing an email address 236 for a user of the recipient device 204, or for the recipient device 204 itself.

Following the recipient device's receipt of the email 230 from the email-hosting device 216, the driver installation module 222 installs a print driver 214 for the printer 202 at the recipient device 204 utilizing the installation data. The document 210 may be included in the body of the email 230, or as an attachment to the email 230. In an example, the recipient device 204 installs the print driver 214 responsive to a user taking an action at the recipient device 204, e.g. interacting with a user interface at the recipient device, thereby instructing the recipient device 204 to cause printing of the email or attached document 210.

Figure 3A:
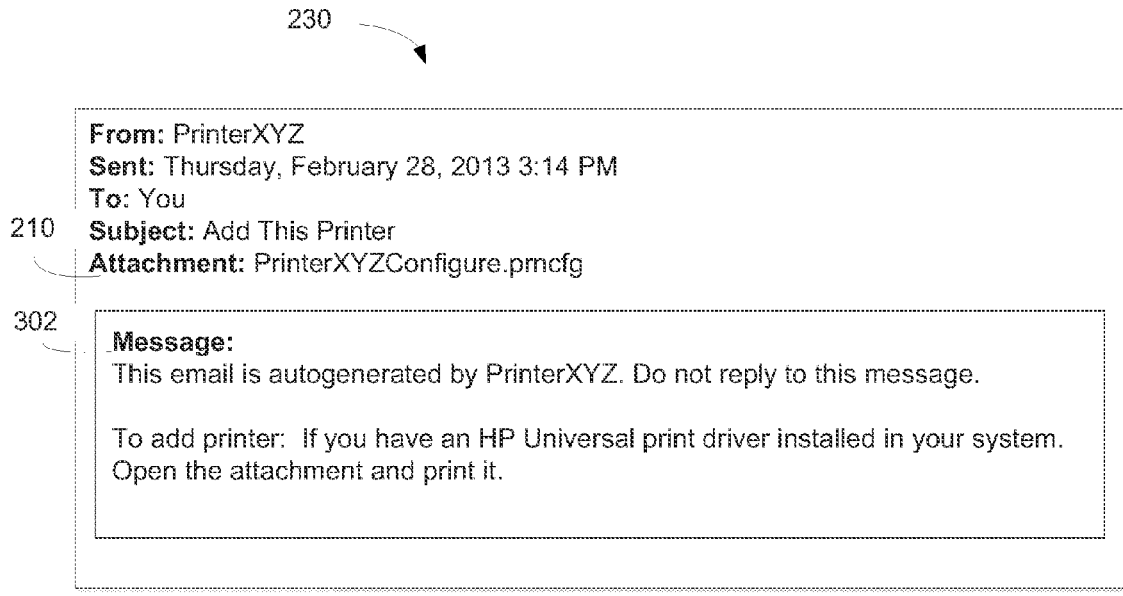
FIG. 3A is an example screen shot of an email to facilitate a print driver installation service, according to various examples.

FIG. 3A provides an example screen shot of an email 230 that includes a document 210. The document 210 contains the printer installation data 212 (FIG. 2). The body of the email includes a message 302 that invites a user to attempt to print the attached document 210, and thereby cause the recipient device 204 to perform automatically an operation to install a print driver utilizing the installation data 212 in the document 210.

Figure 3B:
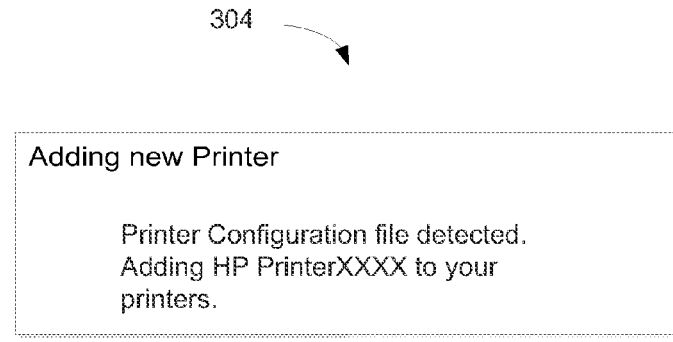
FIG. 3B is an example screen shot of a message to facilitate a print driver installation service, according to various examples.

In examples, the driver installation process may be initiated by a user mouse-clicking, touchpad-clicking, or otherwise interacting with a physical user interface or GUI icon or menu item that normally is used to cause a printing operation. FIG. 3B provides an example screen shot of a message 304 that the driver installation module may cause the recipient device 204 to display, e.g. at a monitor or touchscreen, following a user attempt to print the document 210. The message 304 is to cause a user to understand that a driver installation process has been initiated by the users interaction with a GUI icon or a physical user interface (e.g. a user in initiating a keystroke sequence such as "CTRL P") that in other conditions would cause a printing of the document. In an example, this image is provided by the recipient device in lieu of displaying a print dialog box or other display the user would view during a printing operation.

Figure 4A:
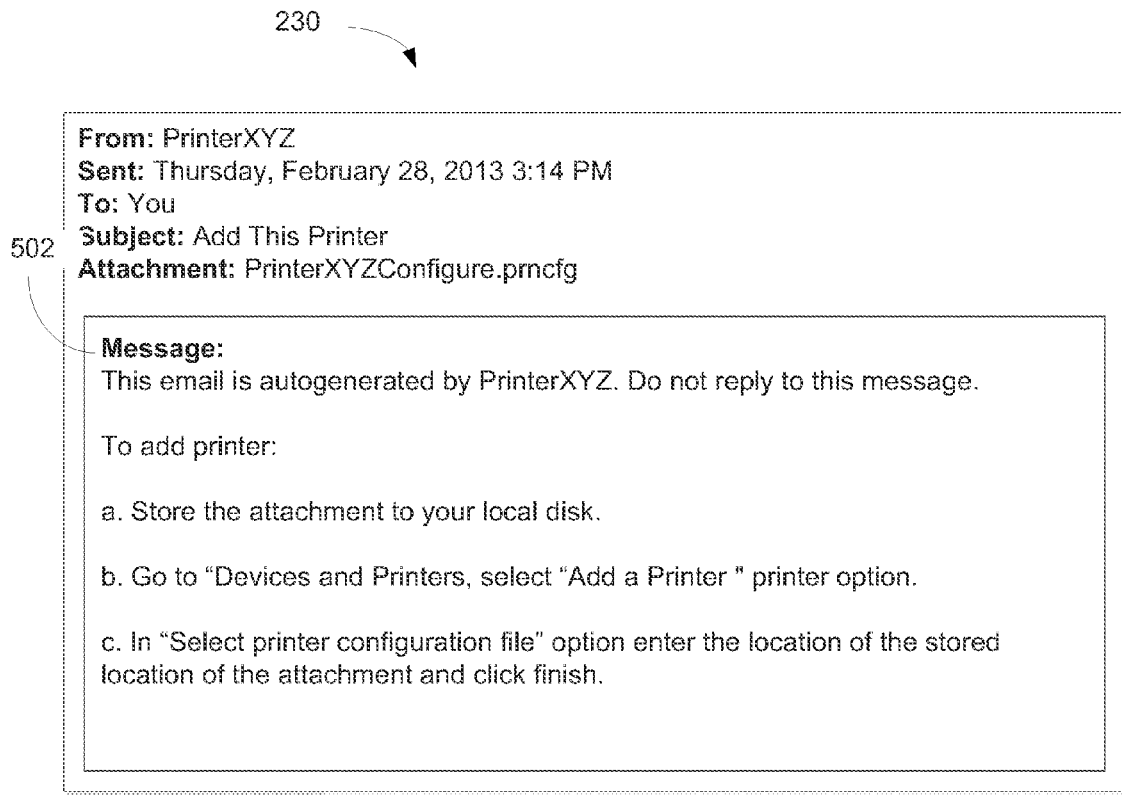
FIG. 4A is an example screen shot of an email to facilitate a print driver installation service, according to various examples.
Figure 4B:
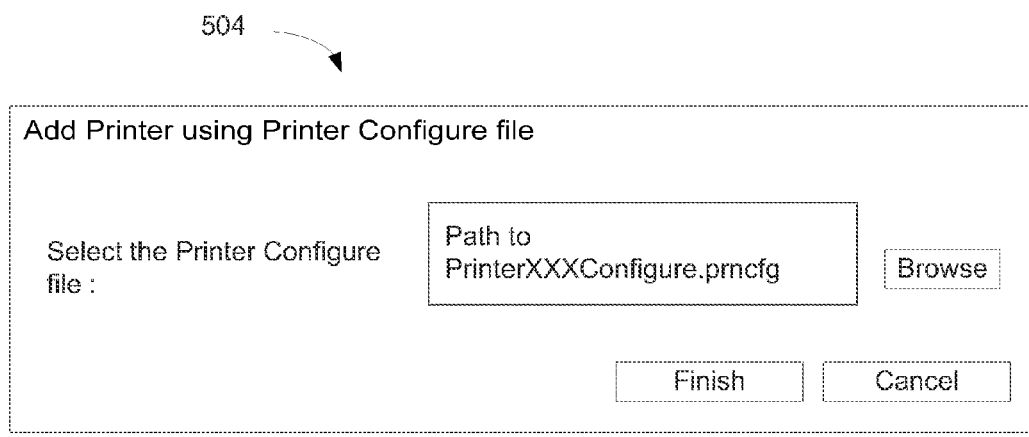
FIG. 4B is an example screen shot of a message to facilitate a print driver installation service, according to various examples.

Moving to FIG. 4A, in other examples, the recipient device 204 may install the print driver 214 responsive to a user taking an action other than attempting to print the email 230 or the document 210 attached to the email. FIG. 4A provides an example screen shot of a body of an email 230 that includes a message 502. The message invites a user to interact with the receiving device 204 to store the attached document 210 to a local disk, hard drive, or other memory accessible to the receiving device 204. The message 502 also invites the user to go to a "Devices and Printers" folder at the receiving device 204, and to choose or initiate an "Add a Printer" printer application or a wizard application that may be generic to the operating system executing at the receiving device 204. The message 502 then invites the user that is interacting with the operating system's "Add a Printer" application or wizard application to point to or direct the application to document to the document 210 that includes the installation data 212. In an example, the "Add a Printer" application or wizard application may enable the user to select the document via a popup file selection window or other GUI interface that may be generic to the operating system executing at recipient device 204. FIG. 4B provides an example screen shot of a message 502 displayed by an application executing at receiving device 204. The message 504 invites a user to select the document 210 that holds the installation data from a document directory or tree, in order to cause the receiving device 204 to choose and add the appropriate print driver 214 utilizing the installation data 212.

Returning to FIG. 2, in an example the document 210 may include a hyperlink 234 or other link or address to be utilized by the recipient device to access or retrieve the proper print driver for 214 for the printer 202. In the example of FIG. 2, the driver installation module utilizes the hyperlink 234 to initiate a communication, via the internet 206, with the driver repository server 218. The driver repository server 218 stores in memory 238 a plurality of print drivers and a database or lookup table that associates each driver with installation data such as printer models, printer names, and printer capabilities. In this example, the recipient device 204 provides some or all of the installation data 212 to the driver repository server 218 via the link and the internet 206. The driver repository server in turn utilizes the provided installation data 212 to choose the correct print driver 214 to enable communications between recipient device 204 and printer 201, and send the print driver 214 to the recipient device 204.

In examples, the sending of the email 230 from the printer 202 to the email-hosting computing device 216, the receipt of email 230 at the recipient computing device 204 from the email-hosting computing device 216, the sending of the installation data from the recipient device 204 to the driver repository server 218, and/or the receipt at the recipient device 204 of the print driver 214 from the driver repository server 218, is over the internet 206 via a networking protocol. The networking protocols utilized may include, but are not limited to, Transmission Control Protocol/Internet Protocol ("TCP/IP"), HyperText Transfer Protocol ("HTTP"), and/or Session Initiation Protocol ("SIP").

The functions and operations described with respect to the print driver installation service 224 and the recipient computing device 204 may be implemented as a non-transitory computer-readable storage medium containing instructions executed by a processor (e.g., processing resource 226) and stored in a memory (e.g., memory 228). In a given implementation, processing resource 226 may represent multiple processors, and memory 228 may represent multiple memories.

Figure 5:
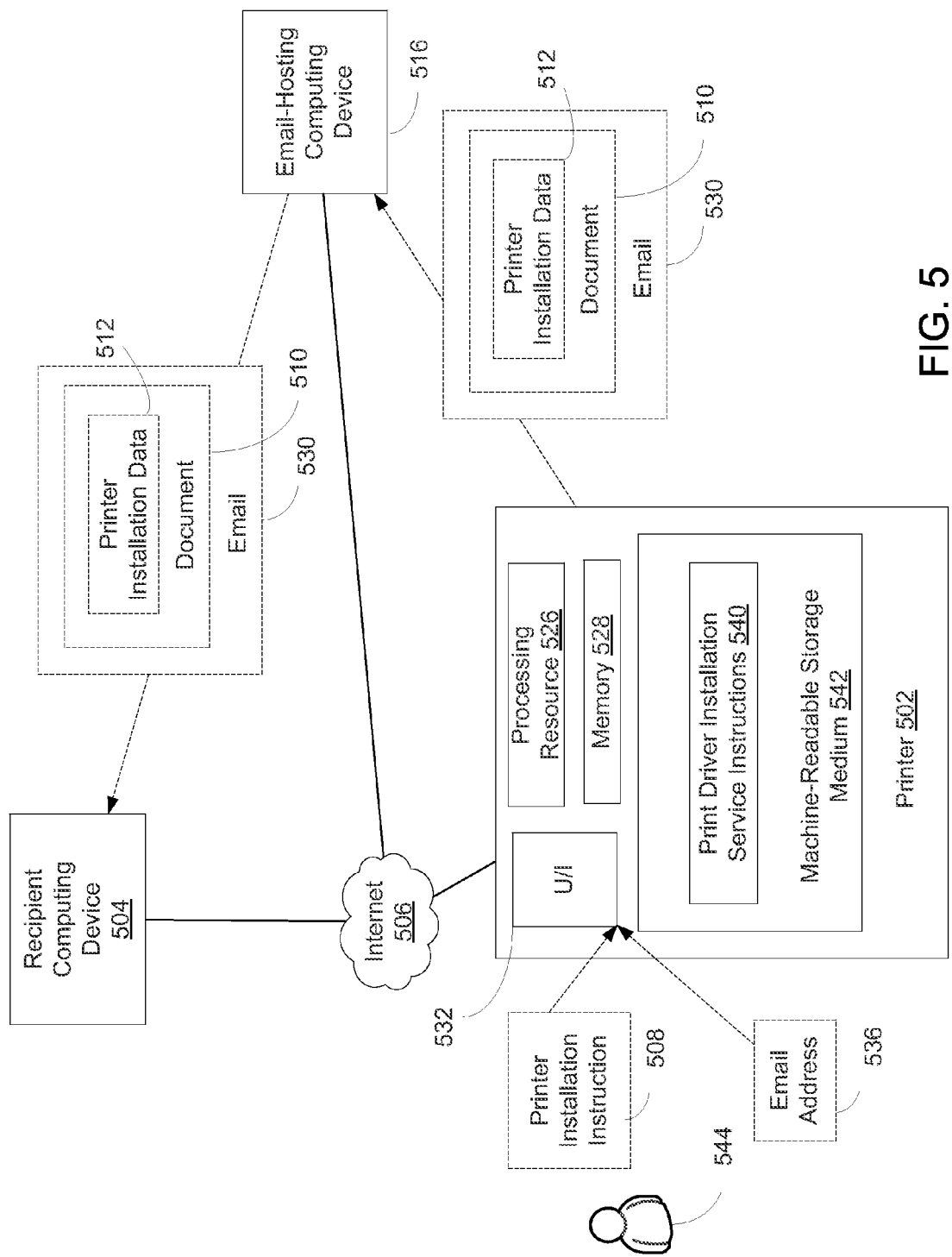
FIG. 5 is a block diagram illustrating a print driver installation system, according to various examples.

FIG. 5 shows an internet-connected printer 502, a recipient computing device 504, and an email-hosting device 516, each electronically connected to an internet 506. The printer 502 and the recipient device 504 are not directly connected to each other. Printer 502 represents generally any computing device or group of computing devices operable to produce a printed print job or printed content, and additionally operable to send and receive internet requests, receive printable content and print jobs, and otherwise communicate other computing devices via the internet 506. Recipient computing device 504 represents generally any computing device or group of computing devices configured to send and receive network requests, send and receive data, and/or otherwise communicate with other computing devices via internet 506. Email-hosting device 516 represents generally any computing device or group of computing devices operable to accept email messages via the internet 506, store the messages, and deliver the messages via the internet 506. Internet 506 may include, at least in part, an intranet, the internet, or a combination of both. The paths followed by internet 506 between the printer 502, recipient device 504, and the email-hosting computing device 516 as depicted in FIG. 5 represent the logical communication paths between these devices, not necessarily the physical paths between the devices.

In an example, printer 502 includes a processing resource 526 and a machine-readable storage medium 528 encoded with instructions 540. In an example, the instructions 540 cause printer 502 to implement a print driver installation service. In some examples, storage medium 528 may include additional instructions. In other examples, instructions 540 and any other instructions described herein in relation to storage medium 528 may be stored on a machine-readable storage medium remote from but accessible to computing device 502 and processing resource 526.

Processing resource 526 may fetch, decode, and execute instructions stored on storage medium 528 to implement the functionalities described below. In other examples, the functionalities of any of the instructions of storage medium 528 may be implemented in the form of electronic circuitry, in the form of executable instructions encoded on a machine readable storage medium, or a combination thereof.

In examples, computing device 502 may be any sort of printing device. In some examples, computing device 502 may implement at least a portion of a print driver installation service. In some examples, instructions 540 may be part of a larger set of instructions implementing a print driver installation service. In some examples, portions of a print driver installation service may be implemented on different computing devices.

Figure 6:
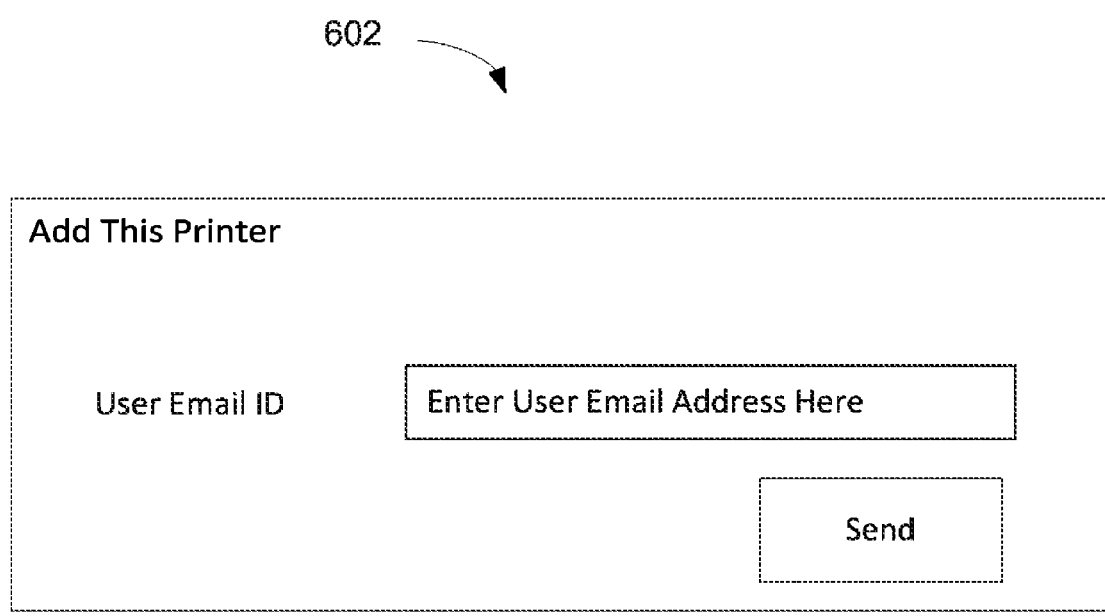
FIG. 6 is an example of a user interface at a printer, to facilitate a print driver installation service according to various examples.

In the example of FIG. 5, a user 544 provides via a user interface 532 included within or attached to printer 502, and the instructions 540 stored at machine readable storage medium 542 cause the printer 502 to receive, a printer installation instruction 508 and an email address 536. In an example, the printer installation instruction 508 and the email address 536 may be input at the printer 502 via the user 544 interacting with an icon or menu item provided at touch screen user interface or other user interface, at the printer 502. FIG. 6 provides an example screenshot of a GUI 602 that may be provided as a touchscreen or as part of a keypad/display screen user interface 532 at printer 502, to facilitate the receipt of the printer installation instruction 508 and email address 536.

Returning to FIG. 5, responsive to receipt of the printer installation instruction 508 and the email address 536, the instructions 540 cause the printer 502 to create a document 510 that includes installation data 512 to be utilized to in the installation of a print driver at a recipient computing device 504 that is not directly connected to the printer 502. In an example, the instructions 540 cause the printer to poll printer components (e.g., obtain identifying information regarding hardware, software or firmware components of the printer) to create the installation data 512. In an example, the print driver is or includes software or programming to facilitate communication between the recipient device and the printer. In an example, the print driver is or includes software or programming to enable the sending of print jobs from the recipient device 504 to the printer 502 in a format understandable to the printer 502.

The instructions 540 additionally cause the printer to create and send via the Internet 506 to an email-hosting computing device 516, an email 530 that includes the document 510. The email-hosting device 516 in turn sends the email 530 to the recipient computing device 504 and the recipient device 504 receives the email. Following the recipient device's receipt of the email 530 from the email-hosting device 516, the recipient device installs a print driver 514 for the printer 502 at the recipient device 504 utilizing the installation data 510.

Figure 7:
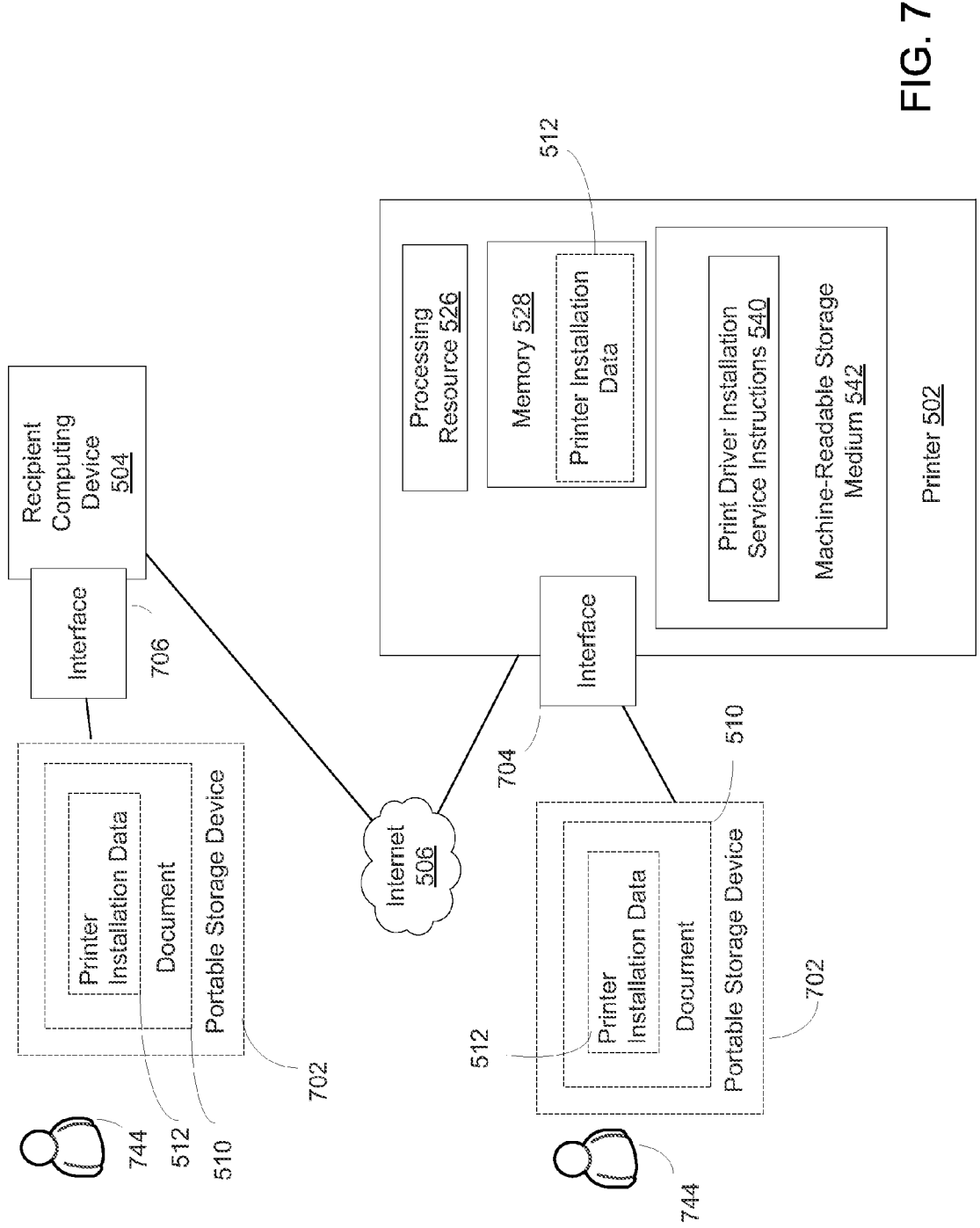
FIG. 7 is a block diagram illustrating a print driver installation system, according to various examples.

FIG. 7 illustrates another example in which a user 744 inserts a portable memory device 702 into a USB interface or other interface 704 at the printer 502 to establish an electronic connection between the portable memory device 702 and the printer 502. In an example, the portable memory device 702 may be a USB flash drive or other data storage device that includes flash memory with an integrated Universal Serial Bus (USB) interface. In other examples, other forms of portable memory devices may be used, including, but not limited to portable storage drives with RAM or CD-ROM memory.

The printer 502 creates a document 510 that includes installation data 510 for the printer 502, and sends the document 510 to the portable memory device 702. In this example, the user 744 in turn inserts the portable memory device 702 into a USB interface or other interface 706 at the recipient device 504 or otherwise brings the portable memory device 702 into an electronic connection with the recipient device 504. After the electronic connection is established, the recipient device 504 obtains the document with the installation data 512, and utilizes the installation data 512 to install a driver for the printer 502.

In another example, the connection 704 between the portable memory device 702 and the printer 502, and/or the connection 706 between the portable memory device 702 and the recipient device 504, may be a wireless connection.

Figure 8:
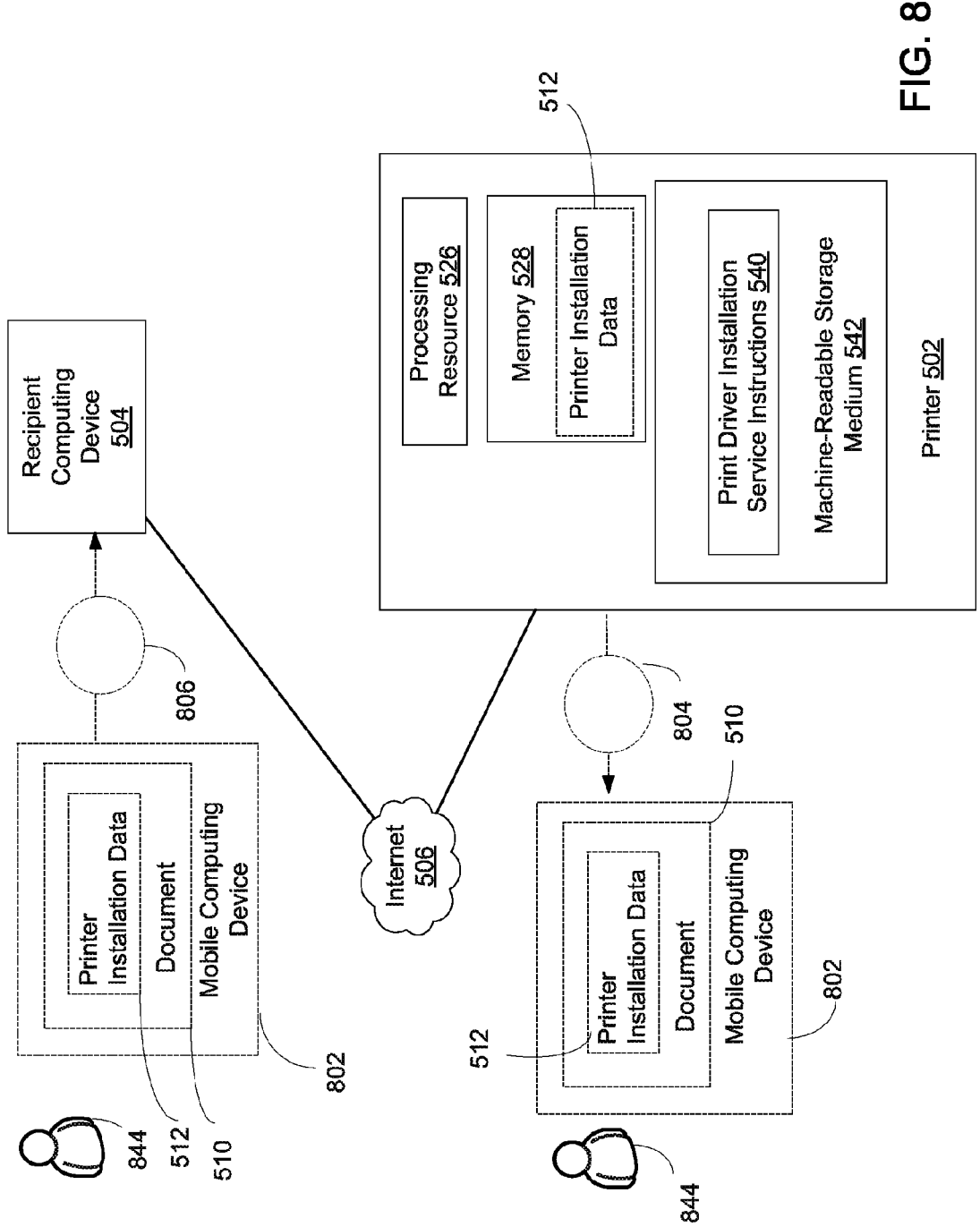
FIG. 8 is a block diagram illustrating a print driver installation system, according to various examples.

FIG. 8 illustrates another example in which a user 844 brings smartphone or other mobile computing device 802 into a wireless connection 804 with the printer 502. Mobile computing device 802 represents generally a smartphone, tablet computer, notebook computer, or any other mobile computing device configured to send and receive data, and/or otherwise communicate with the printer 502 and the recipient device 504 via a near field communication ("NFC"), Bluetooth®, or other wireless protocol.

In an example, the wireless connection 804 is via a near field communication ("NFC"), Bluetooth®, other wireless communication connection 804. In this example, the user 844 in turn brings the mobile computing device 802 into a NFC, Bluetooth®, or other wireless communication connection 806 with the recipient device 504. After the wireless connection is established, the recipient device 504 obtains the document 510 with the installation data 512 and utilizes the installation data 512 to install a driver for the printer 502.

In some examples, instructions 540 may be part of an installation package that, when installed, may be executed by processing resource 526 to implement the functionalities described herein in relation to instructions 540. In such examples, storage medium 528 may be a portable medium, such as a CD, DVD, or flash drive, or a memory maintained by a server from which the installation package can be downloaded and installed. In other examples, instructions 540 may be part of an application or applications already installed on computing device 502 including processing resource 526. In such examples, the storage medium 528 may include memory such as a hard drive, solid state drive, or the like. While in the examples of FIGS. 5-8 the storage medium 528 and memory 522 appear as separate components or modules, in other examples some or all of memory 522 may be included within or a part of storage medium 528. In yet other examples, some or all of storage medium 528 may be included within or be a part of memory 522. In some examples, functionalities described herein in relation to FIG. 5 may be provided in combination with functionalities described herein in relation to any of FIG. 1-2, 3A-3B, 4A-4B, or 9.

Figure 9:
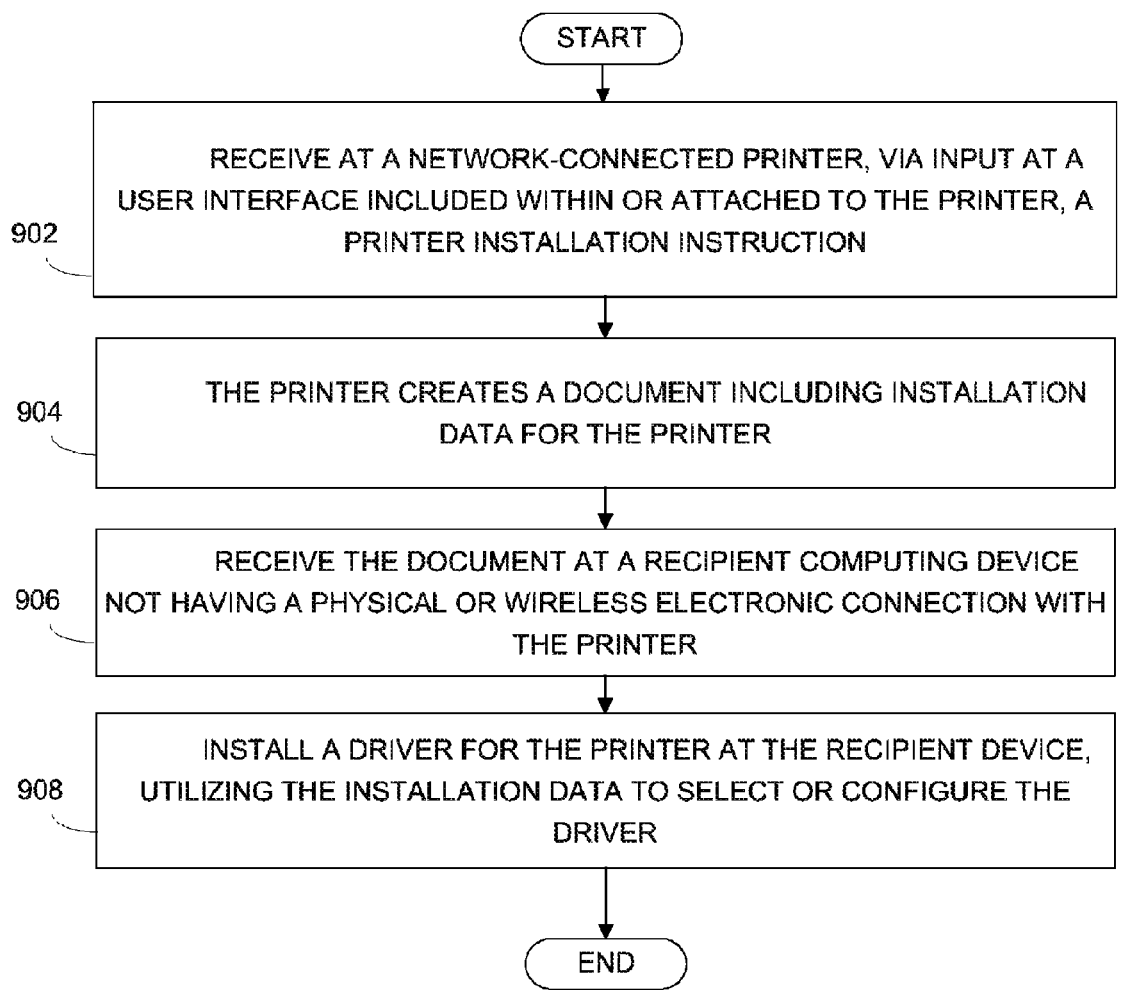
FIG. 9 is a flow diagram depicting steps taken to implement various examples.

FIG. 9 is a flow diagram of operation in a system according to various examples. In discussing FIG. 9, reference may be made to the diagram of FIGS. 2, 5, 7 and 8 to provide contextual examples. Implementation, however, is not limited to those examples. Starting with FIG. 9, a printer installation instruction is received at a network-connected printer, via input at a user interface included within or attached to the printer (block 902). Referring back to FIGS. 5, 7, and 8, the instructions 540, when executed by processing resource 526, may be responsible for implementing block 402.

Continuing with FIG. 9, the printer creates a document including installation data for the printer (block 904). Referring back to FIGS. 5, 7, and 8, the instructions 540, when executed by processing resource 526, may be responsible for implementing block 904.

Continuing with FIG. 9, the document is received at a recipient computing device not having a physical electronic or wireless connection with the printer (block 906). Referring back to FIG. 2, the installation data module 220 may be responsible for implementing block 906.

Continuing with FIG. 9, a driver for the printer is installed at the recipient device, utilizing the installation data to select or configure the driver (block 908). Referring back to FIG. 2, the driver installation module 222 may be responsible for implementing block 908.

Various modifications may be made to the disclosed examples and implementations without departing from their scope. Therefore, the illustrations and examples herein should be construed in an illustrative, and not a restrictive, sense.

What is claimed is:

1. A computing device comprising:
   a processor; and
   a memory on which is stored instructions that are to cause the processor to:
      receive an email containing a document from an email-hosting computing device, said document including installation data for installing a print driver for a network-connected printer onto the computing device, wherein the network-connected printer generates the email and the document responsive to an interaction with a user interface included within or attached to the printer and sends the email to the email-hosting computing device, and wherein the email includes an invitation for a user to attempt to print the document and thereby install the print driver;
      responsive to receipt of the email, detect a user interaction on the computing device to print the document contained in the email, wherein the computing device is separate from the printer;
      responsive to the detection of the user interaction on the computing device to print the document, install the print driver for the network-connected printer at the computing device utilizing the installation data included in the document.

2. The computing device of claim 1, wherein the network-connected printer is not directly connected to the computing device and wherein the network-connected printer is to generate the email and the document responsive to an interaction with a user interface included within or attached to the network-connected printer.

3. The computing device of claim 2, wherein the email is an email sent from the network-connected printer via an email address received at the printer via user input.

4. The computing device of claim 1, wherein the document is included within the body of the email.

5. The computing device of claim 1, wherein the document is an attachment to the email.

6. The computing device of claim 1, wherein the installation data includes at least one member of the group of a printer IP address, a printer model, a printer name, and a printer capability.

7. The computing device of claim 1, wherein the installation data includes a link or address to be utilized by the computing device to retrieve the driver.

8. The computing device of claim 7, wherein the instructions are further to cause the processor to retrieve the driver from another computing device utilizing the link or the address, and to utilize at least a portion of the installation data to install the print driver for the network-connected printer at the computing device.

9. The computing device of claim 1, wherein the print driver is to enable communication between the computing device and the network-connected printer.

10. The computing device of claim 1, wherein the print driver is to enable the sending of print jobs from the computing device to the network-connected printer in a format understandable to the network-connected printer.

11. A non-transitory computer-readable storage medium comprising instructions that, when executed by a processor of a network-connected printer, cause the processor to:
   receive, via input at a user interface included within or attached to the network-connected printer, a printer installation instruction;
   responsive to receipt of the input, create an email containing a document including installation data for the network-connected printer and including an invitation for a user to attempt to print the document and thereby install a print driver for the network-connected printer using the printer installation instruction; and
   communicate the email containing the document to a recipient device through an email-hosting computing device, wherein the recipient device is to access and utilize the installation data to select or configure the print driver for the network-connected printer on the recipient device responsive to a user interaction at the recipient device to attempt to print the document.

12. The medium of claim 11, wherein the instructions are further to cause the processor to:
- receive an email address provided via a user interface within or connected to the network-connected printer; and
- send the email to the received email address to the email-hosting computing device.

13. The medium of claim 11, wherein the instructions are further to cause the processor to poll printer components to create the installation data.

14. A print driver installation method, comprising:
- receiving, at a computing device, an email containing a document from an email-hosting computing device, said document including installation data for installing a print driver for a network-connected printer onto the computing device, wherein the network-connected printer generates the email and the document responsive to an interaction with a user interface included within or attached to the printer and sends the email to the email-hosting computing device, and wherein the email includes an invitation for a user to attempt to print the document and thereby install the print driver;
- responsive to receipt of the email, detecting, at the computing device, a user interaction to the print the document contained in the email; and
- responsive to the detection of the user interaction at the computing device to print the document, utilizing the installation data included in the document to select or configure the print driver for the network-connected printer at the computing device.

\* \* \* \* \*